(12) United States Patent
Kaneko et al.

(10) Patent No.: US 7,207,726 B2
(45) Date of Patent: Apr. 24, 2007

(54) OPTICAL CONNECTOR USING AN OPTICAL FIBER HAVING A SPECIAL FIBER PORTION AS A PART THEREOF

(75) Inventors: Go Kaneko, Tokyo (JP); Akihiro Onogawa, Tokyo (JP); Yuichi Koreeda, Tokyo (JP); Jun Takeda, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 65 days.

(21) Appl. No.: 10/801,009

(22) Filed: Mar. 16, 2004

(65) Prior Publication Data

US 2004/0184740 A1 Sep. 23, 2004

(30) Foreign Application Priority Data

Mar. 19, 2003 (JP) ............................. 2003/075168

(51) Int. Cl.
*G02B 6/38* (2006.01)
*G02B 6/26* (2006.01)
*G02B 6/42* (2006.01)

(52) U.S. Cl. ........................ 385/70; 385/52; 385/53; 385/58; 385/59; 385/60; 385/65; 385/80

(58) Field of Classification Search .................. None
See application file for complete search history.

(56) References Cited

U.S. PATENT DOCUMENTS 4,548,630 A * 10/1985 Biedka .................. 65/501
5,151,964 A * 9/1992 Carpenter et al. ............ 385/98
5,367,594 A * 11/1994 Essert et al. .................. 385/70
5,694,506 A 12/1997 Kobayashi et al.
5,963,692 A 10/1999 Marazzi et al.
5,993,070 A * 11/1999 Tamekuni et al. ............ 385/65
6,296,398 B1 * 10/2001 Lu .............................. 385/60
6,491,442 B1 12/2002 Murakami et al.

(Continued)

FOREIGN PATENT DOCUMENTS

DE           0964279       12/1999

(Continued)

OTHER PUBLICATIONS

European Search Report, dated Jul. 22, 2004.

(Continued)

*Primary Examiner*—Frank G. Font
*Assistant Examiner*—Erin D. Chiem
(74) *Attorney, Agent, or Firm*—Baker Botts L.L.P.

(57) ABSTRACT

In an optical connector including an optical connector plug holding a first optical fiber and an optical connector plug holding a second optical fiber, the optical connector plugs cooperates with each other to obtain a connected state in which exposed longitudinal ends of the first and the second optical fibers are brought into contact with each other. The first optical fiber includes a long fiber portion and a short fiber portion higher in breakage resistance than the long fiber portion. One of the longitudinal ends of the short fiber is fused to one of longitudinal ends of the long fiber portion. Another of the longitudinal ends of the short fiber portion is exposed to serve as one of the exposed longitudinal ends.

10 Claims, 7 Drawing Sheets

U.S. PATENT DOCUMENTS 6,676,299 B1 * 1/2004 Durrant et al. .............. 385/71

FOREIGN PATENT DOCUMENTS

| JP | 5119235 | 5/1993 |
|---|---|---|
| JP | 05119235 | 5/1993 |
| JP | 08122575 A * | 5/1996 |
| JP | 10123366 | 5/1998 |
| JP | 2000304978 | 11/2000 |
| JP | 200282257 | 3/2002 |

OTHER PUBLICATIONS

Patterned Optical Ribbon Fibre With Fibre Physical Contact Connect Or For Optical Fibre Interconnection, M. Kobayashi, et al., Electronic Letters, Sep. 25, 1997, vol. 33 No. 20 (2 pages).

Glas—Die Sichere Verbindung, G. Taubitz, Technische Rundschau, Hallwag, Verlag, Bern CH Mar. 14, 1997 pp. 40-42.

* cited by examiner

OPTICAL CONNECTOR USING AN OPTICAL FIBER HAVING A SPECIAL FIBER PORTION AS A PART THEREOF

This invention claims priority to prior Japanese application JP 2003-75168, the disclosure of which is incorporated herein by reference.

BACKGROUND OF THE INVENTION

This invention relates to an optical connector for connecting optical fibers by bringing longitudinal end faces of the optical fibers into contact with each other.

An optical connector of the type is disclosed, for example, in U.S. Pat. No. 6,491,442 as an optical fiber connector. By the use of the optical fiber connector, it is possible to suitably connect an optical system.

In the optical fiber connector, an outer member holds a portion of an optical fiber remote from its connecting end which is connectable to a connecting end of a counterpart optical fiber. An aligning member is held by the outer member so as to be movable along the optical fiber. The aligning member carries out positioning of the connecting end of the optical fiber. The aligning member is urged by a spring in a direction to project from the outer member.

When connecting the optical fiber to the counterpart optical fiber, the aligning member is moved in a direction opposite to the foregoing direction against an urging force applied by the spring. So that, the connecting end of the optical fiber is projected from the aligning member and is brought in press contact with the connecting end of the counterpart optical fiber with bending of at least one of the optical fibers.

In order to prevent breakage due to such bending, use is made of the optical fiber which is strengthened and is therefore expensive. This results in an increase in cost required for connection of the optical system.

SUMMARY OF THE INVENTION

It is therefore an object of the present invention to provide a connection apparatus capable of connecting an optical system with high accuracy and at low cost.

It is another object of the present invention to provide an optical connector which requires a reduced amount of an expensive optical fiber.

Other objects of the present invention will become clear as the description proceeds.

According to one aspect of the present invention, there is provided an optical connector comprising a first connector element holding a first optical fiber and a second connector element holding a second optical fiber, the first and the second connector elements cooperating with each other to obtain a connected state in which exposed longitudinal ends of the first and the second optical fibers are brought into contact with each other, wherein the first optical fiber comprising a long fiber portion having longitudinal ends, a short fiber portion higher in breakage resistance than the long fiber portion and having longitudinal ends, and a fusion connection portion where one of the longitudinal ends of the short fiber is fused to one of the longitudinal ends of the long fiber portion, another of the longitudinal ends of the short fiber portion being exposed to serve as the exposed longitudinal end of the first optical fiber.

According to another aspect of the present invention, there is provided a connector element for connecting a connection object and comprising an optical fiber; and a clamp portion holding the optical fiber, the optical fiber including a long fiber portion having longitudinal ends, and a short fiber portion connected to one of the longitudinal ends of the long fiber portion and having high breakage resistance and flexibility, the short fiber portion having a connecting end protruding from the clamp portion to be brought into contact with said connection object.

DESCRIPTION OF THE PREFERRED EMBODIMENT

Referring to FIGS. 1 to 4, description will be made of an optical connector according to one embodiment of the present invention.

The optical connector illustrated in the figure is for use in connecting an optical system and comprises an optical connector plug 12 as a first connector element holding a first optical fiber group 11 and an optical connector plug 14 as a second connector element holding a second optical fiber group 13. Each of the first and the second optical fiber groups 11 and 13 includes a number of optical fibers. Each of the optical fibers of the first optical fiber group 11 will be called a first optical fiber. Each of the optical fibers of the second optical fiber group 13 will be called a second optical fiber.

The optical connector plugs 12 and 14 are connected to each other by an optical connector adapter 21. The optical connector adapter 21 has a number of V grooves 21a. Each optical fiber of the first optical fiber group 11, i.e., the first optical fiber and each optical fiber of the second optical fiber group 13, i.e., the second optical fiber are positioned to face to each other in each V groove 21a.

When the optical connector plugs 12 and 14 are moved towards each other, each optical fiber of the first optical fiber group 11 and each optical fiber of the second optical fiber group 13 are brought into contact with each other. When the optical connector plugs 12 and 14 are moved further towards each other, bending of each optical fiber of the first optical fiber group 11 occurs as clearly shown in FIG. 4. By restoring force produced by such bending, each optical fiber of the first optical fiber group 11 is brought into strong contact with each optical fiber of the second optical fiber group 11 so as to connect the optical system with high precision. At this time, each optical fiber of the second optical fiber group 13 is prevented from occurrence of bending by a structure which will later be described.

Figure 4:
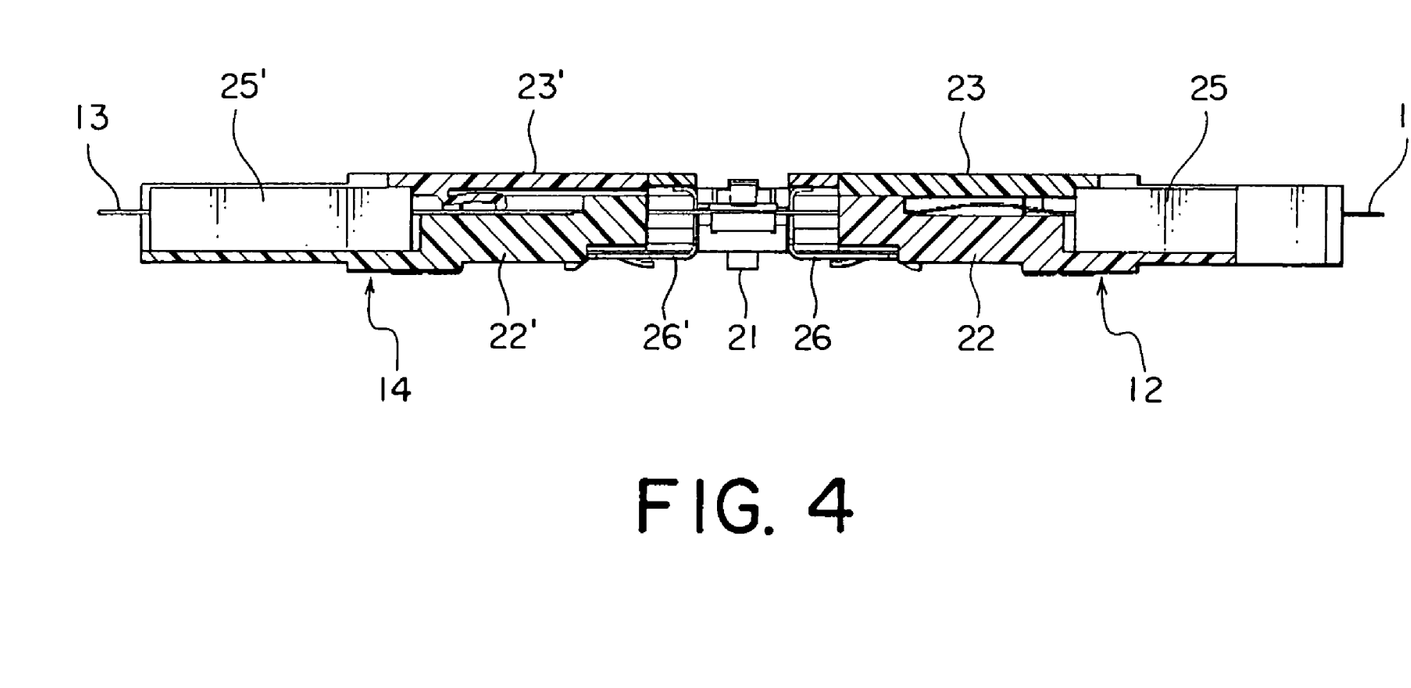
FIG. 4 is a vertical sectional view of the optical connector illustrated in FIG. 1 in the connected state.
Figure 5:
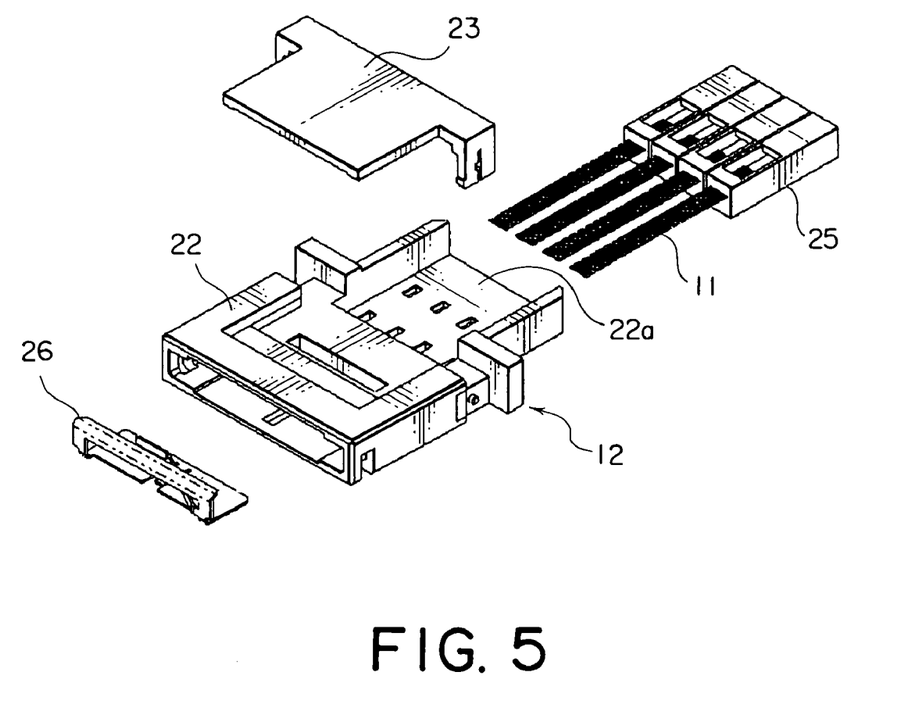
FIG. 5 is an exploded perspective view of a connector element contained in the optical connector illustrated in FIG. 1.

Referring to FIG. 5 in addition to FIGS. 1 through 4, the optical connector plug 12 will be described in detail.

The optical connector plug 12 comprises a frame-like main body 22 made of plastic and having a generally rectangular shape, a plastic cover 22 covering the main body 22, four holding portions or clamp portions 25 made of plastic and clamping or holding the first optical fiber group 11, and a fiber protector 26 made of metal and attached to an end of the main body 22 to protect an end of each optical fiber of the first optical fiber group 11. The clamp portions 25 are arranged in parallel and adjacent to each other and inserted into a receiving portion 22a of the body 22. The cover 23 serves to protect the first optical fiber group 11.

The optical connector plug 14 is similar in structure to the optical connector plug 12. Corresponding parts are designated by like reference numerals with an apostrophe. An elastic member 19 is attached to a lower surface of a cover 23'. The elastic member 19 serves to press the second optical fiber group 13 to prevent occurrence of the above-mentioned bending. The elastic member 19 may be formed integral with the cover 23'. Alternatively, the elastic member 19 may be a separate component made of rubber or the like and attached to the cover 23'.

Thus, a pair of the optical connector plugs to be connected to each other may have a first structure in which the optical fiber is bent and a second structure in which the optical fiber is not bent. In case of the second structure, the optical fiber is pressed by the elastic member attached to the lower surface of the cover.

Next referring to FIGS. 6 and 7, description will be made of the clamp portion 25 and the optical fiber 31 held by the clamp portion 25.

The optical fiber 31 has a long fiber portion 33 positioned on the right side of a line 32 and a short fiber portion 34 positioned on the left side of the line 32. The long fiber portion 33 and the short fiber portion 34 are connected at a fusion connection portion 35 by fusion connection.

The long fiber portion 33 is an ordinary optical fiber and comprises a tape-covered part 33a covered with a tape and a tape-removed part 33b where the tape is removed. The length L2 of the tape-removed part 33b is equal to 6 mm.

The short fiber portion 34 comprises a special optical fiber having a polymer layer on its outer peripheral surface and is designed to have high breakage resistance as compared with the ordinary optical fiber. The short fiber portion 34 comprises a polymer-coated part 34a coated with the polymer layer and a polymer-removed part 34b where the polymer layer is removed. The length L1 of the polymer-removed part L1 is equal to 3 mm.

The clamp portion 25 has an opening portion 25a formed on its upper side, an adhesive filling part 25b continued from the opening portion 25a, and a narrow hole 25c through which the short fiber portion 34 is inserted. After the optical fiber 31 is set in the clamp portion 25, an adhesive (for convenience of illustration, only a part of the adhesive is depicted by a reference numeral 37) is filled through the opening portion 25a into the inside of the clamp portion 25. The adhesive is filled within a range depicted by L3.

Although not shown in the figure, the optical connector plug 14 has a similar structure. On each V groove 21a of the optical connector adapter 21, the special optical fiber of the optical connector plug 12 and the special optical fiber of the optical connector plug 14 are positioned with respect to each other and contacted with each other.

Generally, the ordinary optical fiber is degraded in strength at a portion where coating is removed. However, since the tape-removed part 33a, the fusion connection portion 35, and the polymer-removed part 34b are protected by the adhesive within the clamp portion 25, the optical fiber 31 as a whole is not deteriorated in mechanical characteristics and is hardly affected by the change in environment, such as temperature and humidity.

Figure 8A:
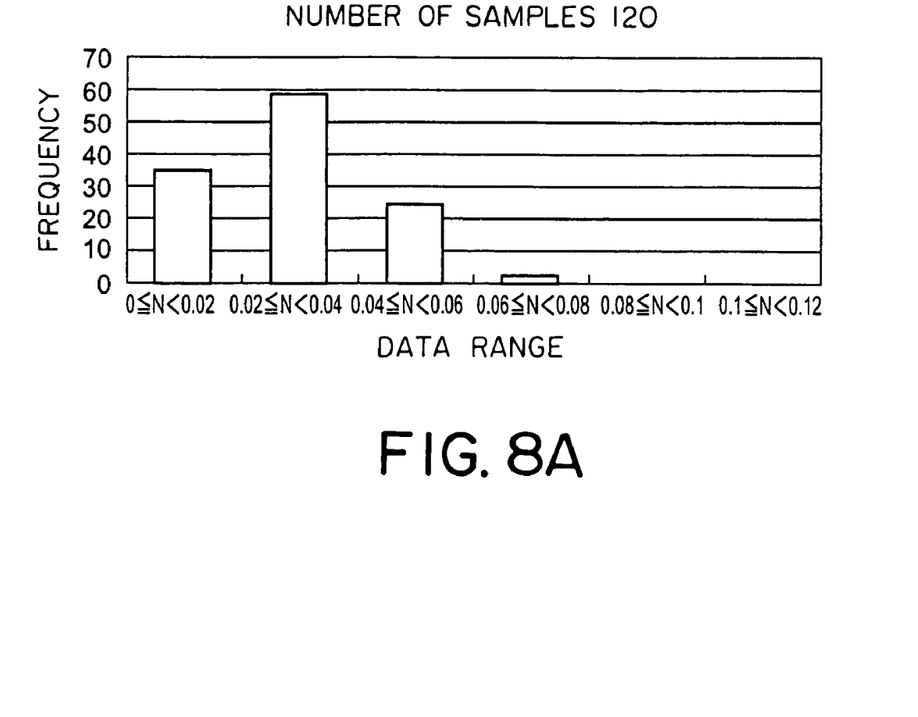
FIG. 8A is a graph showing data related to the optical fiber illustrated in FIG. 7.
Figure 8B:
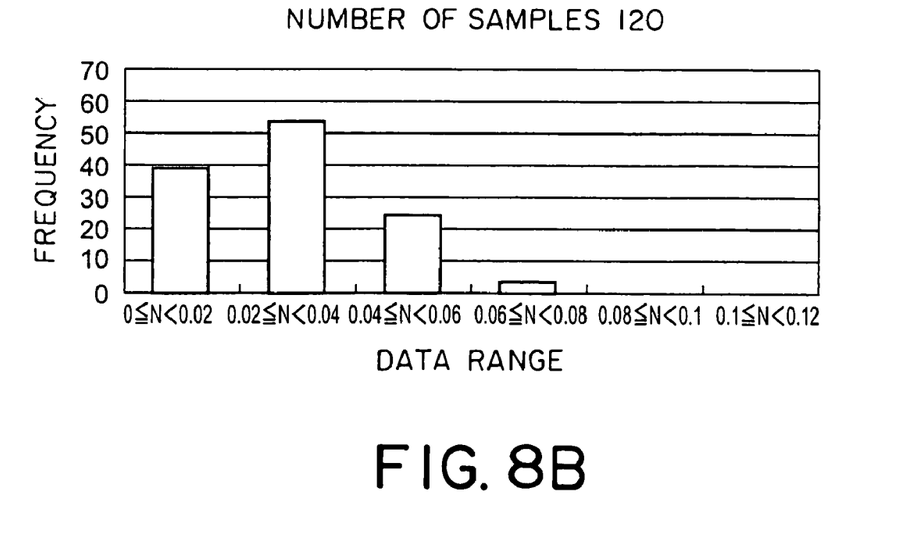
FIG. 8B is a graph showing data related to an ordinary optical fiber.

FIG. 8A shows connection loss due to fusion bonding between the special optical fiber having the polymer layer and the ordinary optical fiber. FIG. 8B shows connection loss due to fusion bonding between the ordinary optical fibers. Herein, N represents the connection loss (dB).

It has been found out that, In each of FIGS. 8A and 8B, the connection loss is within a practically allowable range. The polymer layer at an end of the short fiber portion 34 is peeled off due to discharge during fusion bonding and, therefore, the outer diameter of the polymer-removed part 34b is reduced (for example, 0.115 mm). However, as the connection loss due to fusion bonding, the value in case of connection between the special optical fiber and the ordinary optical fiber is comparable to that in case of connection between the ordinary optical fibers.

In case of FIG. 8A, the average value of the connection loss N is equal to 0.028 and the standard deviation is equal to 0.015.In case of FIG. 8B, the average value of the connection loss N is equal to 0.025 and the standard deviation is equal to 0.017.

Figure 6:
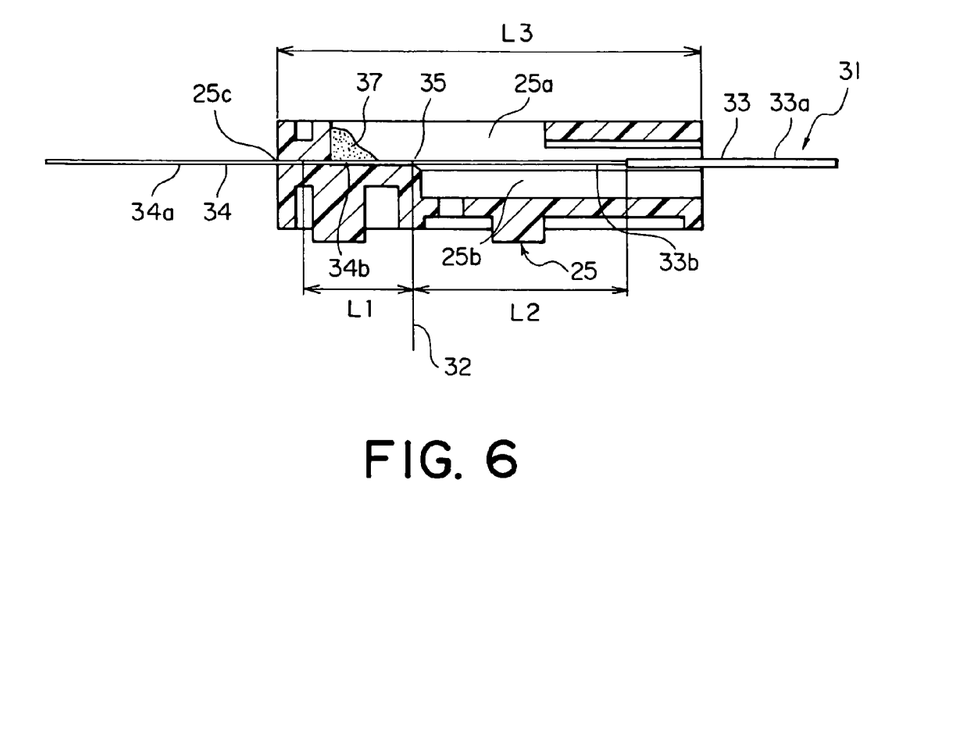
FIG. 6 is a vertical sectional view of a clamp portion contained in the connector element illustrated in FIG. 5.
Figure 7:
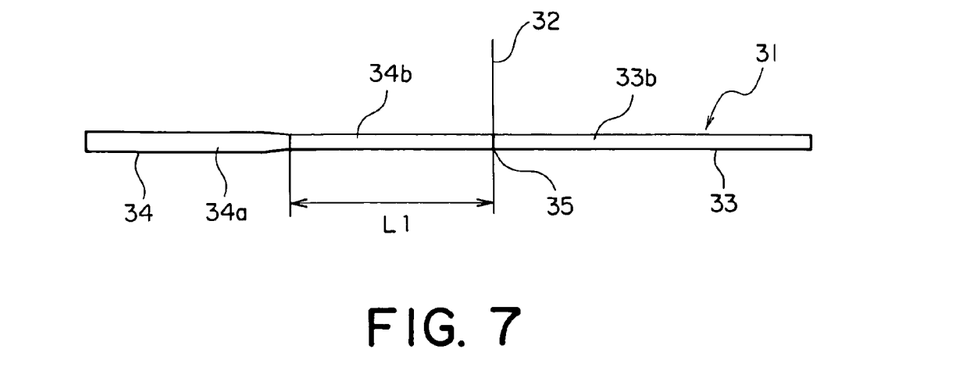
FIG. 7 is an enlarged front view of a characteristic part of an optical fiber held by the clamp portion illustrated in FIG. 5.

Referring to FIGS. 5 through 7, description will be made of a method of assembling the optical connector plug 12. After the short fiber portion 34 and the long fiber portion 33 are fusion bonded and connected to each other, the optical fiber 31 is fixed to each clamp portion 25. After a predetermined number of the optical fibers 31 are fixed, the clamp portions 25 are fixed to the receiving portion 22a of the main body 22. Each clamp portion 25 is a separate component independent of the main body 22, assembling is easy. The optical connector plug 14 is assembled in the similar manner.

Figure 1:
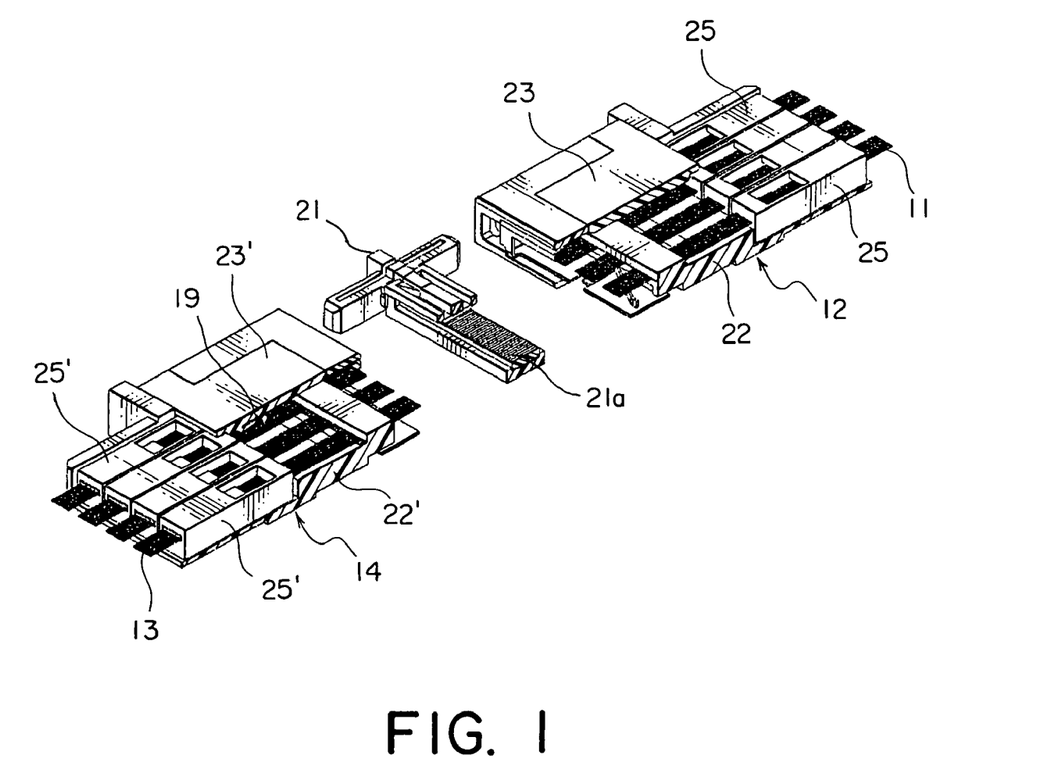
FIG. 1 is a perspective view of an optical connector according to one embodiment of the present invention in an unconnected state, with a part removed so that the interior is seen.
Figure 2:
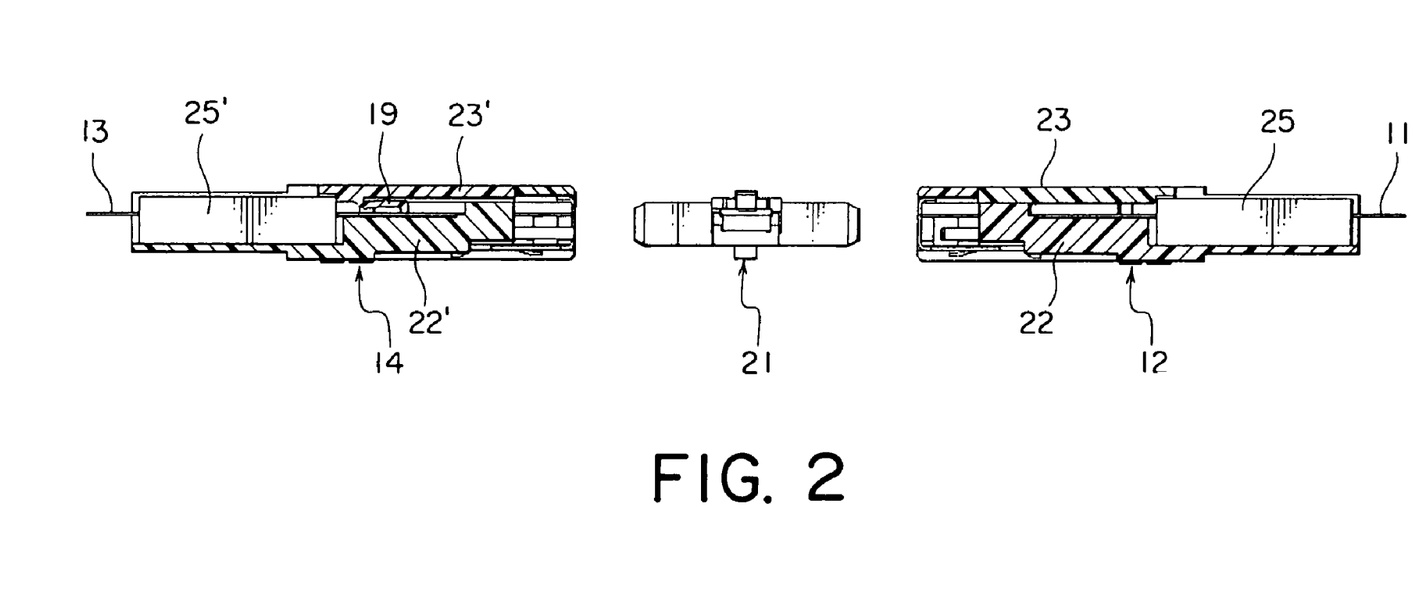
FIG. 2 is a vertical sectional view of the optical connector illustrated in FIG. 1 in the unconnected state.
Figure 3:
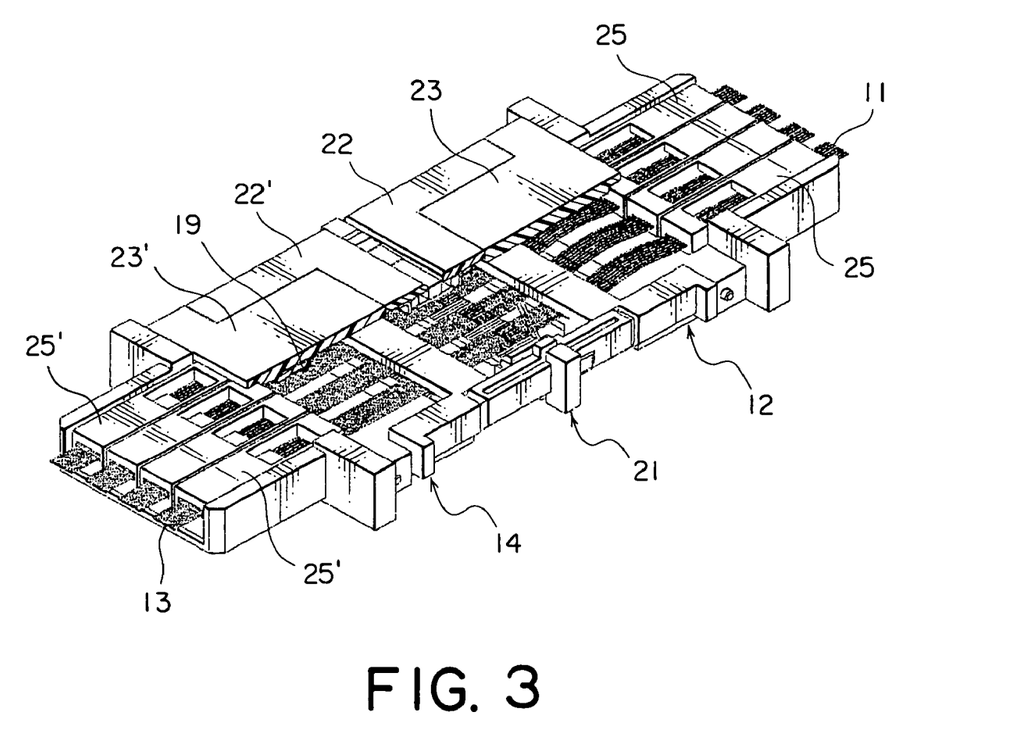
FIG. 3 is a perspective view of the optical connector illustrated in FIG. 1 in a connected state, with a part removed so that the interior is seen.

When the optical connector plugs 12 and 14 are connected through the optical connector adapter 21 as illustrated in FIGS. 3 and 4, the end of each short fiber portion of the optical connector plug 12 and the end of each short fiber portion of the optical connector plug 14 are butted to each other on each V groove 22a of the optical connector adapter 21. Therefore, the short fiber portion 34 protruding from each clamp portion 25 is bent. However, the short fiber portion is not broken because it is the special optical fiber having the polymer layer and has high breakage resistance.

Although the present invention has been shown and described in conjunction with the several preferred embodiments thereof, it will readily be understood by those skilled in the art that the present invention is not limited to the foregoing description but may be changed and modified in various other manners without departing from the spirit and scope of the present invention as set forth in the appended claims.

What is claimed is:

1. An optical connector comprising a first connector element holding a first optical fiber and a second connector element holding a second optical fiber, the first and the second connector elements cooperating with each other to obtain a connected state in which exposed longitudinal ends of the first and the second optical fibers are brought into contact with each other, wherein the first optical fiber comprising:

a long fiber portion having longitudinal ends;

a short fiber portion having a polymer layer on its outer peripheral surface to have a higher breakage resistance than the long fiber portion and having longitudinal ends; and a fusion connection portion where one of the longitudinal ends of the short fiber is fused to one of the longitudinal ends of the long fiber portion, another of the longitudinal ends of the short fiber portion being exposed to serve as the exposed longitudinal end of the first optical fiber;

wherein the first connector element comprises:

a main body;

a clamp portion holding the first optical fiber; and a cover fixing the clamp portion to the main body, wherein the fusion connection portion between the long fiber portion and the short fiber portion is held within the clamp portion, and wherein the short fiber portion is bent by the second optical fiber in the connected state of the optical connector and is brought into contact with the second optical fiber by the resilient force of the short fiber portion.

2. An optical connector according to claim 1, wherein the clamp portion has an opening portion, the fusion bonding portion is disposed in the opening portion.

3. An optical connector according to claim 2, wherein the opening portion is filled with an adhesive, the fusion bonding portion being protected by the adhesive.

4. An optical connector according to claim 1, wherein the second optical fiber comprises:

a long fiber portion having longitudinal ends;

a short fiber portion which is higher in breakage resistance than the long fiber portion of the second optical fiber and has longitudinal ends; and a fusion connection portion where one of the longitudinal ends of the short fiber portion of the second optical fiber is fused to one of the longitudinal ends of the long fiber portion of the second optical fiber, another of the longitudinal ends of the short fiber portion of the second optical fiber being exposed to serve as the exposed longitudinal end of the second optical fiber.

5. An optical connector according to claim 4, wherein the connected state is accompanied with bending of at least one of the short fiber portions of the first and the second optical fibers.

6. An optical connector according to claim 4, wherein the second connector element has a main body, a clamp portion holding the second optical fiber, and a cover fixing the clamp portion to the main body.

7. An optical connector according to claim 6, wherein the clamp portion of the second connector element has an opening portion in which the fusion connection portion of the second optical fiber is disposed in the opening portion of the clamp portion of the second connector element.

8. An optical connector according to claim 7, wherein the opening portion of the clamp portion of the second connector element is filled with an adhesive, the fusion connection portion of the second optical fiber being protected by the adhesive in the opening portion of the clamp portion of the second connector element.

9. An optical connector according to claim 1, further comprising an adapter for receiving the longitudinal ends of the first and the second optical fibers when the connection state is obtained.

10. A connector element for connecting a connection object, the connector element comprising:

an optical fiber; and a clamp portion holding the optical fiber, the optical fiber including:

a long fiber portion having longitudinal ends; and a short fiber portion connected to one of the longitudinal ends of the long fiber portion, wherein the short fiber portion has a polymer layer on its outer peripheral surface to have a high breakage resistance and flexibility, and the short fiber portion has a connecting end protruding from the clamp portion to be brought into contact with said connection object, wherein a fusion connection portion is between the long fiber portion and the short fiber portion, which is held within the clamp portion, and wherein the short fiber portion, which has a higher breakage resistance than the long fiber portion, is bent by the connection object in a connected state between the connector element and the connection object and is brought into contact with the connection object by the resilient force of the short fiber portion.

\* \* \* \* \*